United States Patent
Ganton et al.

(10) Patent No.: US 9,740,265 B2
(45) Date of Patent: Aug. 22, 2017

(54) ELECTRONIC DEVICE FOR EXTENDING BATTERY LIFE IN MOBILE APPLICATIONS

(71) Applicant: QUALCOMM, Incorporated, San Diego, CA (US)

(72) Inventors: Robert Bruce Ganton, San Diego, CA (US); Robert Scott Ballam, Eatons Hill (AU)

(73) Assignee: QUALCOMM Incorporated, San Diego, CA (US)

( * ) Notice: Subject to any disclaimer, the term of this patent is extended or adjusted under 35 U.S.C. 154(b) by 152 days.

(21) Appl. No.: 14/596,087

(22) Filed: Jan. 13, 2015

(65) Prior Publication Data

US 2015/0323984 A1 Nov. 12, 2015

Related U.S. Application Data

(60) Provisional application No. 61/992,039, filed on May 12, 2014.

(51) Int. Cl.
*G06F 1/00* (2006.01)
*G06F 1/32* (2006.01)
*G06F 1/28* (2006.01)

(52) U.S. Cl.
CPC .............. *G06F 1/3206* (2013.01); *G06F 1/28* (2013.01); *G06F 1/3296* (2013.01)

(58) Field of Classification Search
CPC ......... G06F 1/3206; G06F 1/28; G06F 1/3296
See application file for complete search history.

(56) References Cited

U.S. PATENT DOCUMENTS

| | | | |
|---|---|---|---|
| 5,167,024 A | 11/1992 | Smith et al. | |
| 6,442,407 B1 | 8/2002 | Bauer et al. | |
| 6,996,732 B2 | 2/2006 | Kotlow et al. | |
| 7,844,265 B2 | 11/2010 | Kuchibhotla et al. | |
| 8,311,594 B2 | 11/2012 | Islam et al. | |
| 8,779,729 B2 | 7/2014 | Shiraishi | |

(Continued)

FOREIGN PATENT DOCUMENTS

WO   2010056118 A1   5/2010

OTHER PUBLICATIONS

International Search Report and Written Opinion—PCT/US2015/021325—ISA/EPO—dated Sep. 1, 2015.

*Primary Examiner* — Mohammed Rehman
*Assistant Examiner* — Gayathri Sampath
(74) *Attorney, Agent, or Firm* — Loza & Loza, LLP/Qualcomm

(57) ABSTRACT

In one embodiment, an electronic device comprises an oscillator configured to generate an oscillator signal, and a timing circuit configured to generate a count value based on the oscillator signal, to compare the count value with a first compare value, to determine a first expiry event upon the count value matching the first compare value, and to generate a first wakeup signal in response to the first expiry event. The electronic device also comprises a battery pass circuit configured to receive the first wakeup signal, and to couple a power source to a main device in response to the first wakeup signal to power on the main device. The electronic device further comprises a state sequencing circuit configured to store a state of the main device, and an interface circuit configured to communicate the stored state to the main device.

35 Claims, 6 Drawing Sheets

(56) References Cited

U.S. PATENT DOCUMENTS

| | | | |
|---|---|---|---|
| 2003/0120960 A1* | 6/2003 | Cooper | G06F 1/3203 713/320 |
| 2004/0180702 A1 | 9/2004 | Hughes | |
| 2006/0271797 A1* | 11/2006 | Ginggen | G06F 1/3203 713/300 |
| 2008/0065920 A1 | 3/2008 | Suginaka et al. | |
| 2008/0072087 A1* | 3/2008 | Bibikar | G06F 1/26 713/323 |
| 2008/0282100 A1 | 11/2008 | Chen et al. | |
| 2009/0144578 A1 | 6/2009 | Tatsumi | |
| 2009/0235105 A1* | 9/2009 | Branover | G06F 1/3203 713/330 |
| 2011/0158303 A1* | 6/2011 | Gauthier | H04W 52/0283 375/224 |
| 2011/0183727 A1* | 7/2011 | Kato | H04W 52/0293 455/574 |
| 2011/0264936 A1* | 10/2011 | Kamp | G06F 1/3203 713/323 |
| 2012/0173904 A1* | 7/2012 | Jahagirdhar | G06F 1/3206 713/320 |
| 2013/0179707 A1 | 7/2013 | Osuga et al. | |

\* cited by examiner

ELECTRONIC DEVICE FOR EXTENDING BATTERY LIFE IN MOBILE APPLICATIONS

RELATED APPLICATION

This application claims priority under 35 U.S.C. §119(e) to U.S. Provisional Application No. 61/992,039 filed on May 12, 2014, the entire specification of which is incorporated herein by reference.

BACKGROUND

Field

Aspects of the present disclosure relate generally to power management systems, and more particularly, to electronic devices for extending battery life in mobile applications.

Background

In order to improve the battery lifetime of a wireless device which is intended to be worn (e.g., as in the case of a medical patch), extreme low power methods are necessary. A large percentage of the battery energy (e.g., 97+%) of a wireless device may be wasted in a low power state (e.g., idle state) waiting to be activated. A reduction in power consumption (e.g., factor of 2 improvement in power consumption) in this state will allow a reduced battery size and form factor, or a longer shelf life. In the case where the electronics is the limiting factor for shelf life, this may be extremely desirable.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, an electronic device is described herein. The electronic device comprises an oscillator configured to generate an oscillator signal, and a timing circuit configured to generate a count value based on the oscillator signal, to compare the count value with a first compare value, to determine a first expiry event upon the count value matching the first compare value, and to generate a first wakeup signal in response to the first expiry event. The electronic device also comprises a battery pass circuit configured to receive the first wakeup signal, and to couple a power source to a main device in response to the first wakeup signal to power on the main device. The electronic device further comprises a state sequencing circuit configured to store a state of the main device, and an interface circuit configured to communicate the stored state to the main device.

A second aspect relates to a method for extending battery life in a mobile application. The method comprises receiving an oscillator signal from an oscillator, generating a count value based on the oscillator signal, comparing the count value with a first compare value, and determining a first expiry event upon the count value matching the first compare value. The method also comprises powering on a device in response to the first expiry event, and communicating a state stored in a state sequencing circuit to the device while the device is powered on.

A third aspect relates to an apparatus for extending battery life in a mobile application. The apparatus comprises means for receiving an oscillator signal from an oscillator, means for generating a count value based on the oscillator signal, means for comparing the count value with a first compare value, and means for determining a first expiry event upon the count value matching the first compare value. The apparatus also comprises means for powering on a device in response to the first expiry event, and means for communicating a state stored in a state sequencing circuit to the device while the main device is powered on.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
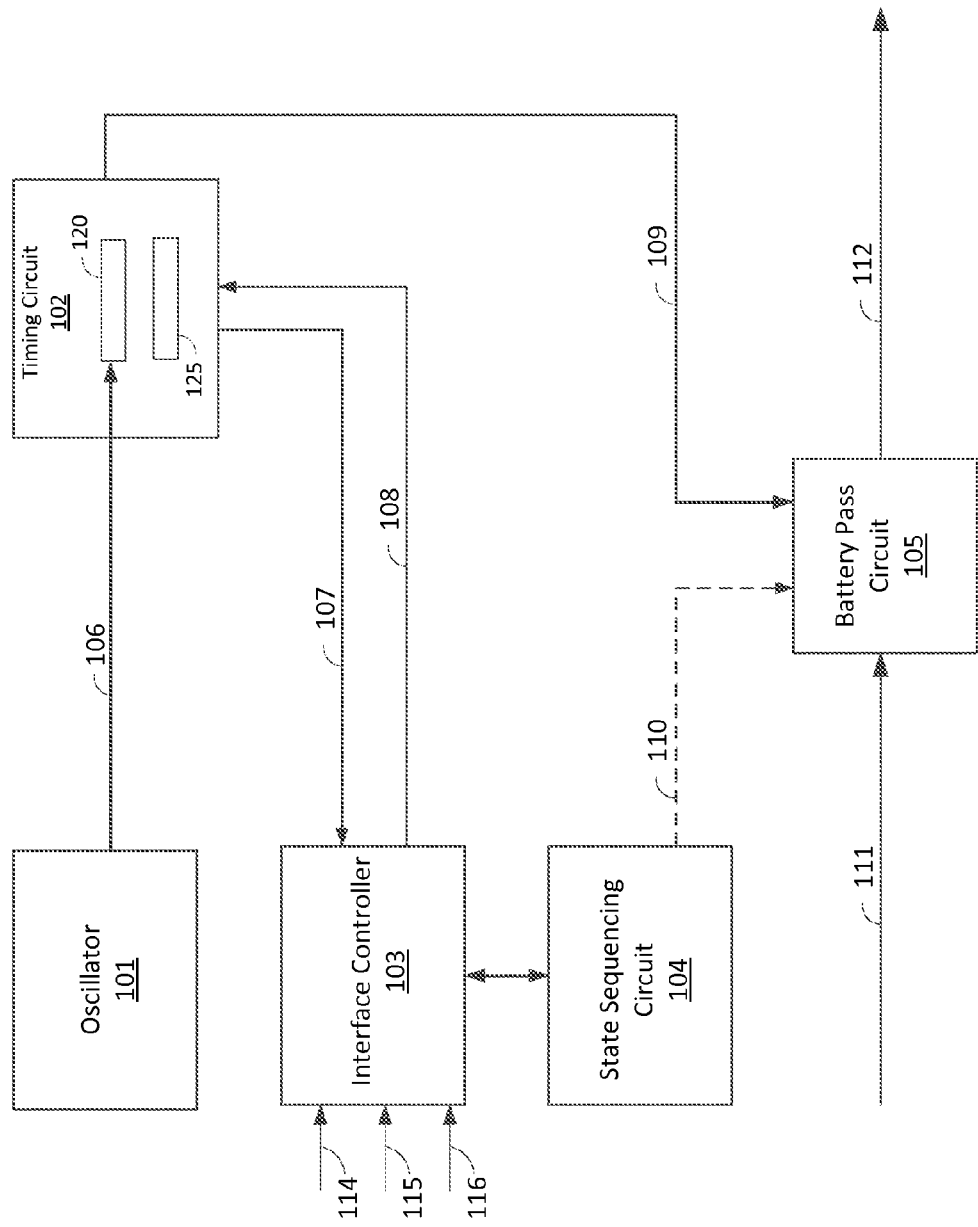
FIG. 1 shows an electronic device for extending battery life in mobile applications according to an embodiment of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In order to improve the longevity of a wireless device to achieve medical grade capabilities, significant low power methods are necessary. A comparatively large percentage of energy (e.g., 97%) is wasted when the device sits in an idle state while only a small percentage of the energy (e.g., 3%) is used in an active state. In this respect, a new method is required to further improve battery performance in medical wirelessly connected patches or other small disposable therapeutic electronic devices. The need to extend battery life for wireless electronic connected patches is significantly important.

In order to achieve this goal, the main method for improvement over conventional methods is to implement a very low power oscillator to keep time for a wireless device (e.g., wireless patch). This can be implemented in a main system-on-chip (SoC) and/or another chip in the device to manage power for the device. Embodiments of the present disclosure provide techniques to deliver order of magnitude improvement over traditional commercial off-the-shelf electronics that are used in these devices. In order to deliver better performance, a wireless device includes a small low power device (e.g., application-specific integrated circuit (ASIC)) and a main device (e.g., SoC). The small low power device consumes far less power than the main device (e.g., SoC), which allows the battery life to be extended greatly. The low power device may have one primary task, manage time and keep power at a minimum during all times except when the main device needs to act. This is usually at pre-determined times or at predetermined rates. Typically the duty cycle of activity is quite low so the opportunity for great improvements in battery life is quite high.

In some aspects, the low power device comprises a low power oscillator and a timing circuit coupled to the low power oscillator, in which the timing circuit automatically activates a battery pass circuit (e.g., one or more PFETs) when the main device needs to be awakened from a sleep state. Activation of the battery pass circuit couples the main device to a battery, thereby powering on the main device.

In particular, a counter in the timing circuit receives an oscillator signal (e.g., clock signal) from the low power oscillator. The counter counts cycles of the oscillator signal to generate a count value, and the timing circuit compares the count value with a wakeup compare value in a register. The wakeup compare value may correspond to a count value at which the main device is to be awakened from the sleep state. When the count value matches the wakeup compare value, the timing circuit asserts a signal to activate the battery pass circuit. The signal may remain asserted until the timing circuit is programmed with a new wakeup compare value or until the low power device receives a signal or instructions from the main device instructing the low power device to turn off the battery pass circuit.

FIG. 1 shows an example of a low power electronic device 100 according to an embodiment of the present disclosure. The low power device 100 may be part of a larger device (e.g., wireless patch) that also includes a main device (shown in FIG. 2). As discussed further below, the low power device 100 manages power for the larger device to significantly extend battery life.

The low power device 100 may comprise a low power oscillator 101, a timing circuit 102, an interface controller 103, a state sequencing circuit 104, and a battery pass circuit 105. The timing circuit 102 is coupled to an output of the oscillator 101 and is configured to receive an oscillator signal 106 from the oscillator 101. The timing circuit 102 includes a counter 120 and a compare register 125. The counter 120 is configured to count cycles of the oscillator signal 106 to generate a count value, and the register 125 is configured to store one or more compare values, as discussed further below.

The timing circuit 102 is also coupled to the interface controller 103 to receive a control signal with one or more compare values and send updates related to the count value maintained by the counter 120. The timing circuit 102 is also coupled to the battery pass circuit 105 to send a wakeup signal that causes the battery pass circuit 105 to turn on (activate) in order to couple a battery (e.g., coin cell battery) to the main device to power up the main device. The interface controller 103 is coupled to the state sequencing circuit 104 for tracking a state of the main device and/or the low power device 100.

The oscillator 101 is configured to drive the counter 120 to generate the count value. In some aspects, the oscillator 101 may be a crystal oscillator, an inductor-capacitor (LC) oscillator, or a resistor-capacitor (RC) oscillator that provides a suitable low power and low cost implementation. The oscillator 101 may generate the oscillator signal at a rate of 32 kHz or other frequency. Although 32 kHz is mentioned as one example, various topologies may lead to other frequencies being optimal. In this regard, the oscillator 101 may consume current in a range of 100 nA to 250 nA. The oscillator 101 may be bias controlled so that the oscillator 101 runs at the lowest power possible over voltage and temperature variations.

The timing circuit 102 is configured to compare the count value from the counter 120 with a wakeup compare value in the register 125 for a match, which corresponds to the occurrence of an expiry event. The goal for the counter 120 is to count 32 kHz ticks, although as mentioned earlier, the frequency may be other than 32 kHz. When the number of ticks (or count value) reaches the wakeup compare value, the timing circuit 102 activates the battery pass circuit 105 that allows the battery to power up the main device. The counter 120 may be a ripple counter, an example of which is discussed below with reference to FIG. 4. The counter 120 may have any length (i.e., number of bits). For example, the length of the counter 120 may depend on the desired duration of a sleep cycle (e.g., a longer length if a longer sleep duration is used or a shorter length if a shorter sleep cycle is used). Accordingly, it is to be appreciated that the present disclosure is not limited to a particular length.

When the main device is woken up, the main device may read out the count value from the counter 120 in the timing circuit 102 via the interface controller 103, and add a count corresponding to a desired delay time to the read count value to generate a new wakeup compare value. The desired delay time may correspond to a time delay until the next wakeup time for the main device. The main device may then write (program) the new wakeup compare value to the register 125 in the timing circuit 102 via the interface controller 103.

In one aspect, the timing circuit 102 may include a second register (not shown) for storing a sleep compare value. In this aspect, after the main device wakes up, the timing circuit 102 may compare the count value from the counter 120 with the sleep compare value to determine when to place the main device back into the sleep state. When the count value matches the sleep compare value, the timing circuit 102 may turn off the battery pass circuit 105 to power off the main device until the next wakeup (which may correspond to the new wakeup compare value programmed into the register 125 discussed above). In one aspect, the main device may program the sleep compare value by reading the count value from the counter 120 via the interface controller 103, and adding a count to the read count value to generate the sleep compare value, where the count corresponds to a time duration that the main device is to be active. The time duration may be based on an estimate of the amount of time the main device is expected to complete one or more tasks. The main device may then write the sleep compare value to the second register (not shown) via the interface controller 103.

Alternatively, when the main device completes one or more tasks in the active state, the main device may send a sleep signal via the interface controller 103 instructing the timing circuit 102 to power off the main device until the next wakeup. In this embodiment, instead of powering off the main device when the sleep compare value is reached, the timing circuit 102 powers off the main device upon receiving the sleep signal.

In another embodiment, the timing circuit 102 may reset the counter 120 to zero each time the main device goes back to sleep. In this embodiment, the same compare value may be used over a plurality of sleep cycles if the duration of each sleep cycle is approximately the same. This is because the counter 120 is reset to zero at the beginning of each sleep cycle. Since the same compare value is used over a plurality of sleep cycles, the compare value in the register 125 does not need to be updated each time the main device wakes up. Thus, the main device does not need to read and update the compare value in the register 125 each time the main device wakes up. This reduces power consumption by reducing the number of transactions (e.g., read and write operations) between the main device and the low power device 100. In this embodiment, the timing circuit 102 may reset the counter 120 to zero and power off the main device upon receiving a sleep signal (e.g., from the main device). The timing circuit 102 may then power the main device back on when the count value of the counter 120 matches the compare value in the register 125.

The interface controller 103 may include a register flag to include an indication of the system's power-up status. For example, the register flag may comprise a bit indicating if the system woke up for the first time (e.g., register bit as "0"), or has been running (e.g., load register bit as "1").

The interface controller 103 may be an I²C interface that receives a serial clock 114, serial data 115, and an address 116. In this example, the interface controller 103 may communicate with the main device over two physical lines: a serial data line and a serial clock line. The serial data line may be used for transferring data between the main device and the low power device, and the serial clock line may carry a clock signal used to synchronize data transfers between the main device and the low power device 100. The main device may address data on the data line to the low power device 100 by transmitting an address of the low power device on the data line. The address of the low power device may be preprogrammed into the low power device, in which the last one or two digits of the address may be set by pulling up or pulling down one or more pins.

In some aspects, the interface controller 103 includes an I/O voltage input to match the voltage of the main device (e.g., I/O rings) to prevent problems with synchronization and power sequencing. This ensures that the voltage of the interface controller 103 is compatible with the voltage level used by the main device. For example, when the main device is communicating with the electronic device 100, the I/O voltage input can indicate what voltage level the main device will be communicating to interpret signals correctly. In another aspect, the interface may use pull-up resistors and an open drain I/O. In this aspect, a pull-up resistor may pull the data line high, in which the interface controller 103 drives the data line low to send a zero and allows the pull-up resistor to pull up the data line to send a one.

The interface controller 103 may be configured to have control over a specified number of registers. The interface controller 103 may have control over a wakeup timer, which is a 16-bit register capable of programming wakeup delays in units of 10 ms. When the wakeup timer expires the device will turn on the battery pass circuit 105. The interface controller 103 may have control over a sequencing register that is a 16 bit register capable of read and write (R/W). The interface controller 103 may have control over a sleep control register that is a 16 bit register, which contains a control mask for enabling/disabling the wakeup timer and other features of the chip. In some aspects, the interface controller 103 has control over an identification register that returns the device slave address.

The electronic device 100, when powered up, causes the battery pass circuit 105 to initially turn on. The electronic device 100 wakes up, for first time, runs an initialization sequence, then programs the compare register located in the counter 102 with a predetermined time value. In this regard, when the main device turns on, the main device determines that it needs to turn off (or enter a sleep state), and then the main device sends a I²C command to the electronic device 100 to turn off the battery pass circuit 105. The default state for the programmable time is to turn the main device on (e.g., activate the battery pass circuit 105) all the time. For example, upon initial power up, the battery pass circuit 105 is enabled and the sleep timer function is disabled. In this regard, the state sequencing circuit 104 may be initially set to 0x00.

The state sequencing circuit 104 is configured to determine (or at least keep track of) multiple states relating to the main device including the sleep state and wakeup state. At first power up, the state sequencing circuit 104 comes out of a power on reset state. The state sequencing circuit 104 may include logic to initially turn on the battery pass circuit 105, and to then turn off the main device that reprograms the counter via the interface controller 103. In some aspects, a path between the state sequencing circuit 104 and the battery pass circuit 105 may be added. In this regard, the state sequencing circuit 104 can turn off battery pass circuit 105, and rely upon the timing circuit 102 to keep the battery pass circuit 105 turned on for a duration of time. For example, the timing circuit 102 may provide an indication of the expiry event to the interface controller circuit 103.

The battery pass circuit 105 is configured to couple the battery to the main device when activated. In this regard, the main device consumes power when necessary and when not necessary, the battery pass circuit 105 does not provide power to the main device. The battery pass circuit 105 may be a power switch (e.g. power head switch) coupled to the power path 111 from the battery and the power path 112 to the main device. In this example, the main device is powered on when the power switch is closed (turned on), and powered off when the power switch is open (turned off). The power switch may comprise one or more power transistors. For example, the power switch may comprise a p-type field effect transistor (PFET), in which the PFET is turned on (activated) by inputting a logic zero to the gate of the PFET and turned off by inputting a logic one to the gate of the PFET.

In some aspects, multiple transistors may be included to activate the power path from the battery to the main device. For example, the battery pass circuit 105 may comprise a first transistor located on the same chip as the state sequencing circuit 104 and timing circuit 102 and a second transistor external to the chip. In this example, the chip may include an internal connection to enable the state sequencing circuit 104 and/or timing circuit 102 to drive the first transistor and a pin to enable the state sequencing circuit 104 and/or timing circuit 102 to drive the second transistor. The first and second transistors may be coupled in parallel and may be activated in sequence. For example, when the main device is to be awakened, the first and second transistors may be activated sequential according to a desired power-up sequence for the main device.

The low power electronic device 100 may be at least a portion of a circuit placed on a corner of a circuit die for the main device, or may be a standalone device on a circuit die that interacts with the main device. If the low power device 100 is part of the circuit die for the main device, then inputs to the interface controller 103 may reach the higher-level infrastructure of the chip to get connections to the interface controller 103. In some aspects, the operating voltage of the low power device 100 may range from 2.0V to 3.3V (optionally 4.25V for Li cell operation). The low power device 100 may exhibit less than 100 nA current consumption during sleep timer operation, and less than 500 nA current consumption during normal operation.

For the example in which the low power device 100 and the main device are on different dies, the low power device 100 may be fabricated on the respective die using a larger size fabrication process than the main device. For example, the low power device 100 may be fabricated using a 65 nm process and the main device may be fabricated using a 16 nm process or smaller. Using a larger size process for the low power device 100 reduces the leakage current of the low power device 100, thereby reducing power consumption and extending the life of the battery. In this example, the low power device 100 may comprise much fewer logic gates than the main device, and may therefore be implemented with larger dimensioned devices (e.g., transistors) to reduce the leakage current of the low power device.

As discussed above, the low power device 101 may use the low power oscillator 101 to keep track of time. The low power oscillator 101 may comprise a low power crystal oscillator (e.g., 32 KHz crystal oscillator), a low power LC oscillator, a low power RC oscillator, etc. In this example, the oscillator signal 106 from the low power oscillator 101 may not provide timing with sufficient accuracy for certain applications. For example, the frequency of the oscillator signal may deviate from an expected frequency and/or drift (e.g., due to changes in temperature), which reduces the ability of the main device to accurately control the wakeup times of the main device. This is because the main device needs to accurately know the frequency of the oscillator signal in order to accurately compute a wakeup compare value corresponding to a desired wakeup time.

To improve the timing of wakeups, the main device may periodically calibrate the low power oscillator 101. Calibration of the low power oscillator 101 may involve determining the frequency of the low power oscillator 101 using a signal having a known frequency as a reference, and calibrating a count value from the low power oscillator 101 based on the determined frequency, as discussed further below. The signal may be from another oscillator having an accurate frequency compared to the low power oscillator 101. Accordingly, it is to be appreciated that calibration of the low power oscillator 101 does not require adjusting the frequency of the low power oscillator 101.

Figure 2:
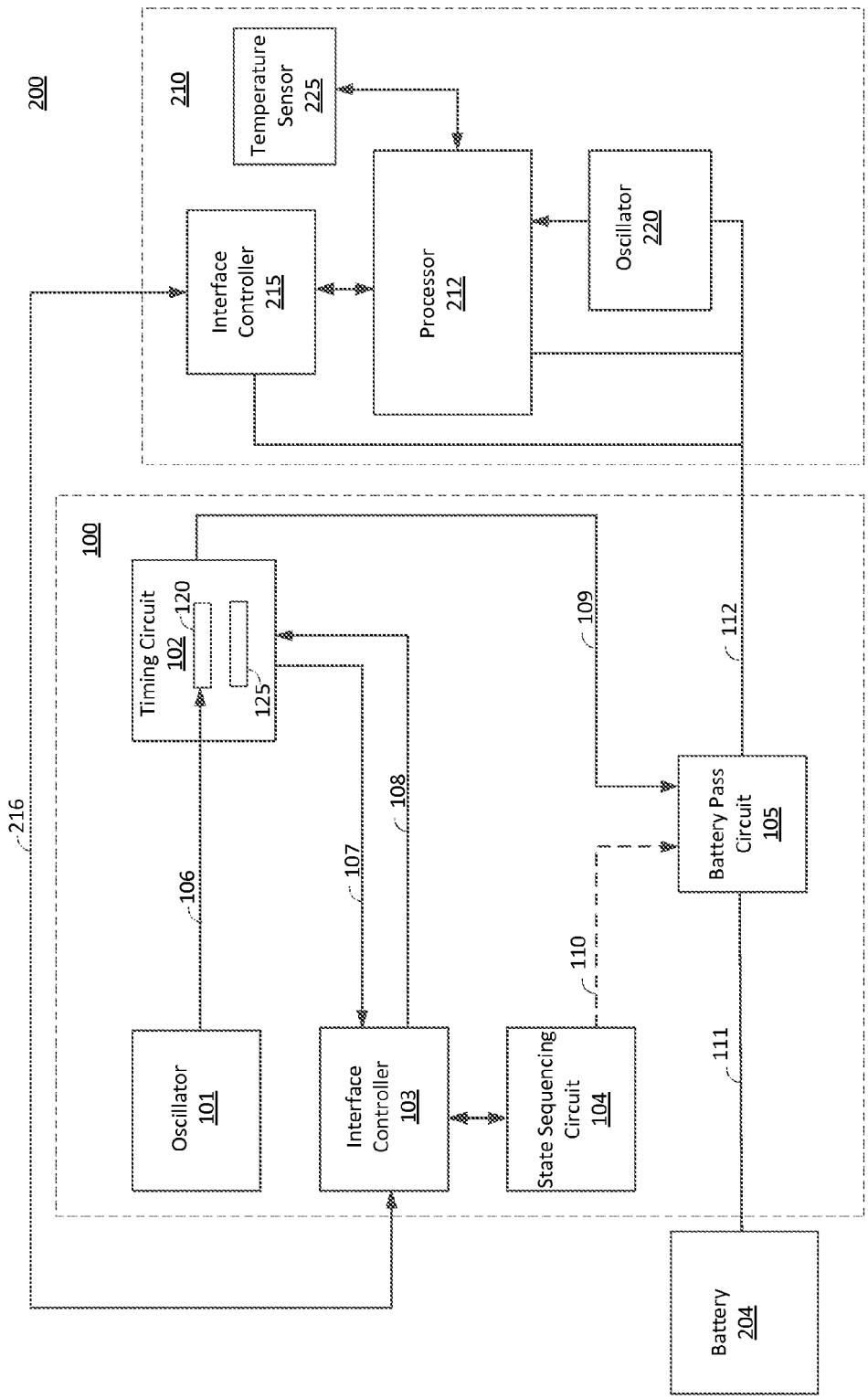
FIG. 2 shows an example of a system including the electronic device according to an embodiment of the present disclosure.

In this regard, FIG. 2 shows an example of a system 200 comprising the low power device 100, the main device 210 and the battery 204. The system 200 may be part of a wireless device (e.g., wireless patch), in which the low power device 100 manages power for the wireless device to extend the battery life of the wireless device.

In the example shown in FIG. 2, the main device 210 comprises a second oscillator 220, a processor 212 and a second interface controller 215. The processor 212 may be implemented with a microprocessor, a digital signal processor (DSP), an application specific integrated circuit (ASIC), a field programmable gate array (FPGA) or other programmable logic device, discrete gate or transistor logic, or any combination thereof to perform the functions described herein. The processor 212 may communicate with the low power device 100 via the interface controller 215 (e.g., according to an I²C protocol). Although one communication link 216 is shown between the low power device 100 and the main device 210 for ease of illustration, it is to be appreciated that the link 216 may comprise multiple links (e.g., a serial clock link and a serial data link according to the I²C protocol).

In some aspects, the second oscillator 220 consumes more power than the low power oscillator 101, but provides a more accurate oscillator signal (e.g., clock signal). The second oscillator 220 may be used for other purposes in addition to calibration. For example, the second oscillator 220 may provide a clock signal to the processor 212 for timing operations in the processor 212. In another example, the second oscillator 220 may provide an oscillator signal to a radio-frequency (RF) transceiver (shown in FIG. 5) used for wireless communication between the main device 210 and an external device (e.g., mobile device). Thus, calibration may be performed using a preexisting oscillator on the main device. This may reduce power consumption and area compared with using a dedicated oscillator for calibration, although it is appreciated that a dedicated oscillator may be used for calibration.

As discussed above, the main device 210 may be periodically turned on by the low power device 100 to perform one or more tasks during each wakeup cycle, and may spend most of the time in the sleep state to conserve power. Thus, the second oscillator 220 may be turned on only a small fraction of the time to converse power. In contrast, the low power oscillator 101, which requires less power and is less accurate than the second oscillator 220, may remain turned on without interruption to maintain continuous timing for the low power device 100.

In some aspects, the low power oscillator 101 may be calibrated on a periodic basis. For example, the low power oscillator 101 may be calibrated each time the main device 210 wakes up. In another example, the low power oscillator 101 may be calibrated every Nth wakeup of the main device 210, where N is an integer greater than one, as discussed further below.

Methods for calibrating the low power oscillator 101 using the second oscillator 220 will now be described according to various embodiments of the present disclosure. The low power oscillator 101 is referred to as the first oscillator in the discussion below.

During calibration, a number of cycles of the first oscillator 101 and a number of cycles of the second oscillator 220 are counted over approximately the same time period to generate a first count value and a second count value, respectively. In one example, the time period corresponds to a predetermined number of cycles of the second oscillator 220. In this example, cycles of the first oscillator 101 are counted over the predetermined number of cycles of the second oscillator 220. In another example, the time period corresponds to a predetermined number of cycles of the first oscillator 101. In this example, cycles of the second oscillator 220 are counted over the predetermined number of cycles of the first oscillator 101. Since the frequency of the second oscillator 220 is accurately known (relative to the first oscillator 101), the frequency of the first oscillator 101 may be estimated as:

$$F_1 = \frac{\text{Count1}}{\text{Count2}} \cdot F_2 \qquad (1)$$

where $F_1$ is the estimated frequency of the first oscillator 101, $F_2$ is the known frequency of the second oscillator 220, count1 is the count value of the first oscillator 101, and count2 is the count value of the second oscillator 220.

In this aspect, the estimated frequency of the first oscillator 101 may be compared to an expected frequency of the first oscillator 101 to determine whether the oscillator 101 is running fast or slow with respect to the expected frequency and to adjust the wakeup compare value for the next wakeup accordingly. For example, if the oscillator 101 is running faster than expected, then the wakeup compare value for the next wakeup may be increased, and, if the oscillator 101 is running slower than expected, then the wakeup compare value for the next wakeup may be decreased. The calibration procedure discussed above may be performed by the timing circuit 102 and/or the processor 212, as discussed further below.

In one aspect, when the main device 210 wakes up, the processor 212 may perform a calibration of the first oscillator 101 as follows. The processor 212 may count a predetermined number of cycles of the second oscillator 220. At the start of the count, the processor 212 may read the count value of the counter 120 via the interface controllers 103 and 215 or a dedicated link (not shown). When the count for the second oscillator 220 reaches the predetermined number, the processor 212 may read the count value of the counter 120 again, and subtract the previously read count value from the most recently read count value to determine a count value for the first oscillator 101 corresponding to the predetermined count of the second oscillator 220. The processor 212 may then estimate the frequency of the first oscillator 101 according to equation (1), in which the predetermined count for the second oscillator 220 corresponds to count2 and the determined count value for the first oscillator 101 corresponds to count1. The processor 212 may then adjust the wakeup compare value for the next wakeup time accordingly (e.g., increase the wakeup compare value if the first oscillator 101 is running faster than expected).

Figure 3:
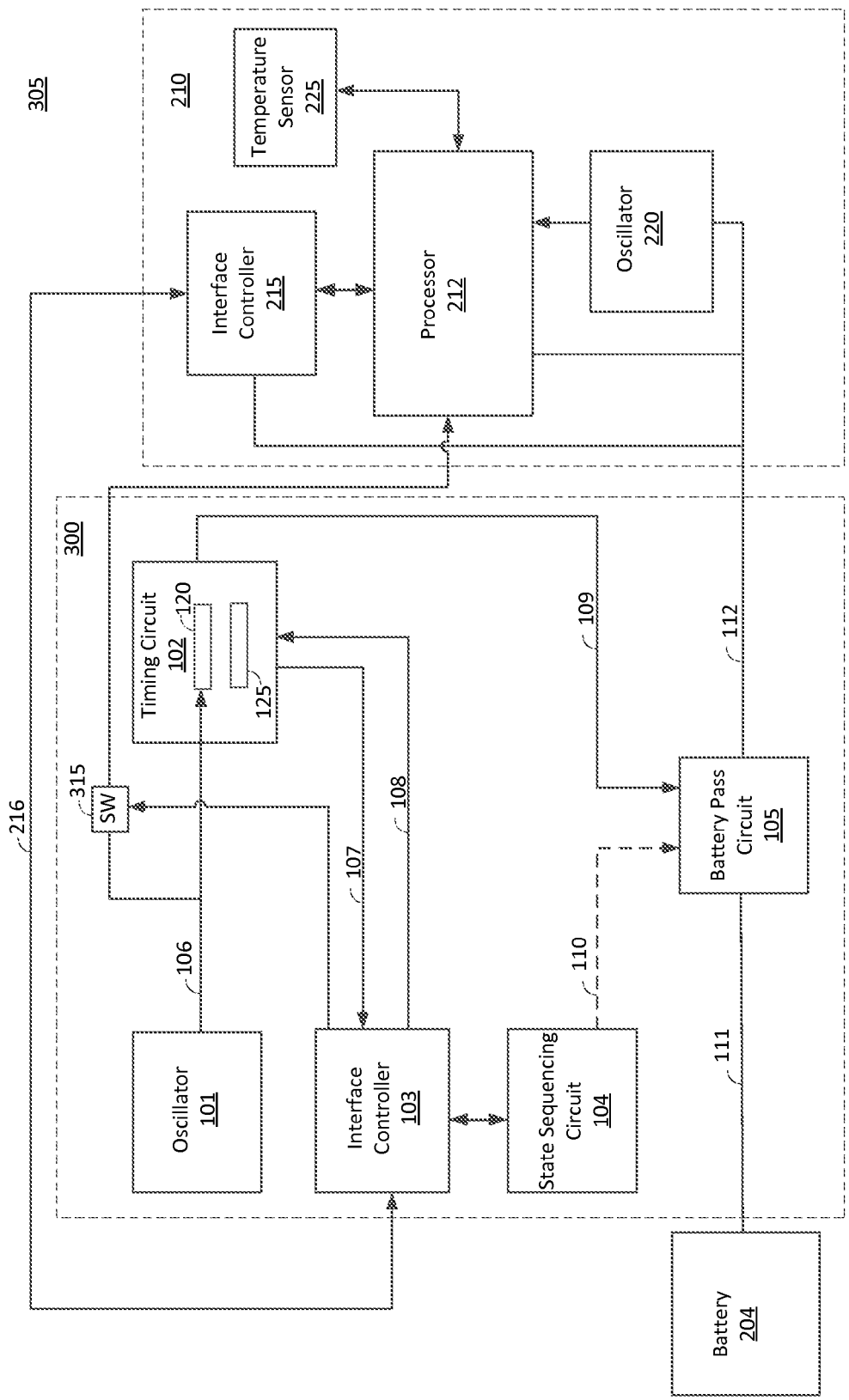
FIG. 3 shows an example of a system including the electronic device according to another embodiment of the present disclosure.

To facilitate calibration of the first oscillator 101, the processor 212 may receive the oscillation signal 106 from the first oscillator 101, and use the oscillation signal 106 to count cycles of the first oscillator 101 directly. In this regard, FIG. 3 shows an example of a system 305 comprising the low power device 300, the main device 210 and the battery 204. In this example, the oscillator signal 106 of the first oscillator 101 is selectively coupled to the processor 212 of the main device 210 using a switch 315, which may reside on the low power device 300. When the switch 315 is closed (turned on), the processor 212 is coupled to the first oscillator 101, and when the switch is opened (turned off), the processor 212 is decoupled from the first oscillator 101.

In one embodiment, the processor 212 may control the switch 315 via the interface controllers 103 and 215 or a direct control link (not shown) between the main device 210 and the switch 315. In this embodiment, when the processor 212 needs to calibrate the first oscillator 101, the processor 212 may turn on the switch 315 to couple the oscillator signal 106 to the processor 212.

During calibration, the processor 212 may count cycles of the first oscillator 101 to determine the count value count1 for the first oscillator 101. For example, the processor 212 may count a number of cycles of the first oscillator 101 over a predetermined number of cycles of the second oscillator 220. In this example, the count value count2 for the second oscillator 220 is equal to the predetermined number of cycles, and the count value count1 for the first oscillator 101 is equal to the number of cycles of the oscillation signal 106 counted over the predetermined number of cycles of the second oscillator 220. In another example, the processor 212 may count a number of cycles of the second oscillator 220 over a predetermined number of cycles of the first oscillator 101. In this example, the count value count1 for the first oscillator 101 is equal to the predetermined number of cycles, and the count value count2 for the second oscillator 220 is equal to the number of cycles of the second oscillator 220 counted over the predetermined number of cycles of the first oscillator 101.

After calibrating the first oscillator 101, the processor 212 may turn off the switch 315 to decouple the first oscillator 101 from the processor 212. Thus, the first oscillator 101 may be coupled to the processor 212 during calibration, and decoupled from the processor 212 the rest of the time, including when the main device 210 is in the sleep state.

In some embodiments, the processor 212 may compute a scaling factor based on the calibration of the first oscillator 101 as follows:

$$SF = \frac{F_1}{F_{expected}} \quad (2)$$

where $F_1$ is the estimated frequency of the first oscillator 101 in equation (1), $F_{expected}$ is the expected frequency of the first oscillator 101, and SF is the scaling factor. In this aspect, the processor 212 may determine a count value corresponding to a time delay until the next wakeup time based on the expected frequency of the first oscillator 101, and multiply the determined count value by the scaling factor SF. The scaled count value may then be added to the current count value of the counter 120 to generate the wakeup compare value for the next wakeup cycle.

It is to be appreciated that other scaling factors may be generated based on the calibration procedure discussed above, and therefore that the present disclosure is not limited to the exemplary scaling factor in equation (2). For example, the scaling factor may be computed as follows:

$$SF' = \frac{Count1}{Count2} \quad (3)$$

where count1 and count2 are the count values of the first and second oscillators, respectively, over the same period of time, and SF' is the scaling factor. In this aspect, the processor 212 may determine a count value corresponding to a time delay until the next wakeup time based on the frequency of the second oscillator 220. The processor 212 may then determine the count value for the first oscillator 101 corresponding to the time delay by multiplying the count value based on the frequency of the second oscillator 212 by the scaling factor SF'. The processor 212 may then determine the wakeup compare value for the next wakeup time by adding the scaled count value to the current count value of the counter 120 (which the processor 212 may read from the timing circuit 102). The processor 212 may then write (program) the wakeup compare value to the compare register 125 via the interface controllers 103 and 215.

In another example, the scaling factor may be computed as follows:

$$SF'' = \frac{Count1}{Count1'} \quad (4)$$

where count1 is the actual the count value of the first oscillator 101, count1' the expected count value based on the expected frequency of the first oscillator 101, and SF" is the scaling factor. The expected count value count1' represents the number of cycles of the first oscillator 101 that would have been counted over a predetermined number of cycles of the second oscillator 220 if the first oscillator 101 were running at the expected frequency. In this aspect, the processor 212 may determine a count value corresponding to a time delay until the next wakeup time based on the expected frequency of the first oscillator 101, and multiply the determined count value by the scaling factor SF". The scaled count value may then be added to the current count value of the counter 120 to generate the wakeup compare value for the next wakeup cycle.

In one embodiment, the processor 212 may send the scaled count value corresponding to the time delay until the next wakeup to the timing circuit 102 instead of generating the corresponding wakeup compare value. In this embodiment, the timing circuit 102 may add the received count value to the current count value of the counter 120 to generate the corresponding wakeup compare value. The timing circuit 102 may then write the wakeup compare value to the compare register 125.

As discussed above, the first oscillator 101 may be calibrated each time the main device 210 wakes up. In another aspect, the first oscillator 101 may be calibrated less frequently to reduce power consumption. For example, the first oscillator 101 may be calibrated every Nth wakeup of the main device 210, where N is an integer greater than one. In this example, the low power device 100 may include a wakeup register that keeps track of the number of times the main device 210 has been woken up. Each time the main device 210 wakes up, the processor 212 may increment the wakeup register by one. Each time the count in the wakeup register reaches N, the processor 212 may calibrate the first oscillator 101 and reset the wakeup register to zero. Alternatively, the processor 212 may calibrate the first oscillator 101 each time the count in the wakeup register is a multiple of N. In either case, the processor 212 may read the wakeup register each time the main device 210 wakes up to determine whether the first oscillator 101 needs to be calibrated.

In this example, each time the processor 212 calibrates the first oscillator 101, the processor 212 may write the corresponding scaling factor to a calibration register (not shown) in the low power device 100 or the main device 210. When the processor 212 turns on during a wakeup cycle in which the first oscillator 101 is not calibrated, the processor 212 may read the scaling factor from the calibration register. The processor 212 may then use the read scaling factor to adjust the count value corresponding to the time delay until the next wakeup cycle (e.g., multiply the count value by the scaling factor). If the main device 210 wakeups at predetermined intervals, then the count value corresponding to the time delay until the next wakeup cycle may be predetermined and stored in a memory (e.g., register).

Thus, in this example, the processor 212 may calibrate the first oscillator 101 during every Nth wakeup of the main device 210 to update the scaling factor in the calibration register. During wakeup cycles in which the first oscillator 101 is not calibrated, the processor 212 may read the most-recently updated scaling factor from the calibration register and use the read scaling factor to determine the wakeup compare value for the next wakeup cycle, as discussed above.

It is to be appreciated that the present disclosure is not limited to calibrating the first oscillator 101 at predetermined intervals (e.g., every Nth wakeup). For example, the main device 210 may comprise a temperature sensor 225 coupled to the processor 212. In this example, when the processor 212 calibrates the first oscillator 101 for the first time, the processor 212 may receive a temperature reading from the temperature sensor 225, and write the temperature reading to a temperature register (not shown) in the low power device 100 or main device 210. On the next wakeup cycle, the processor 212 may receive a current temperature reading from the temperature sensor 225, retrieve the temperature reading from the temperature register, and compare the two temperature readings. If the difference between the temperature readings is below a temperature threshold, then the processor 212 may use the scaling factor in the calibration register to determine the wakeup compare value for the next wakeup cycle. If the difference is equal to or above the temperature threshold, then the processor 212 may calibrate the first oscillator 101 to update the scaling factor in the calibration register, and use the updated scaling factor to determine the wakeup compare value for the next wakeup cycle. The scaling factor may be updated according to this embodiment, for example, when the frequency of the first oscillator 101 is sensitive to changes in temperature.

It is to be appreciated that the temperature sensor 225 may be integrated on the low power device 100 instead of the main device 210. For example, the temperature sensor 225 may be located near the first oscillator 101 to get an accurate temperature reading for the first oscillator 101. In this embodiment, temperature readings from the temperature sensor 225 may be communicated to the processor 212 via communication link 216 or another link.

As discussed above, instead of sending the wake compare value for the next wakeup cycle to the timing circuit 102, the processor 212 may send a scaled count value corresponding to the time delay until the next wakeup cycle to the timing circuit 102. In this embodiment, the timing circuit 102 may add the received count value to the current count value of the counter 120 to generate the wakeup compare value for the next wakeup cycle, and write the wakeup compare value to the compare register 125.

In some aspects, the calibration register may include an offset value. The offset value may be used to adjust the wakeup compare value to account for delays in communicating signals between the low power device 100 and the main device 210. For example, in the embodiment in which the processor 212 reads the count value of the counter 120 to generate the wakeup compare value, the offset value may correspond to the time delay between reading the count value from the counter 120 and the read count value reaching the processor 212. In this example, the processor 212 may adjust the read count value by the offset value to account for the delay. In another example, in the embodiment in which the processor 212 generates a count value corresponding to the time delay until the next wakeup cycle and sends the count value to the low power circuit 100, the offset may correspond to the time delay between sending the count value from the processor 212 and the corresponding wakeup compare value being written to the compare register 125. In this example, the offset value may adjust the count value to account for the delay. In some aspects, the offset value may be in the form of an offset count value and may be scaled by the scaling factor. For example, for the scaling factor SF in equation (2), the offset count value before scaling may be computed by multiplying the expected frequency of the first oscillator 101 by the corresponding time delay (e.g., delay of writing from the processor 212 to the compare register 125).

As discussed above, in one embodiment, the timing circuit 102 may reset the counter 120 to zero each time the main device goes back to sleep. In this embodiment, the wakeup compare value in the register 125 may stay the same between calibrations. When the main device is awoken in a wakeup cycle in which the oscillator 101 is not calibrated, the main device may leave the wakeup compare value in the register 125 alone. In this case, the main device does not read and update the wakeup compare value, thereby reducing power consumption. When the main device is awoken in a wakeup cycle in which the oscillator 101 is calibrated, the main device may compute a new wakeup compare value based on the calibration. For example, the main device may compute the new wakeup compare value based on a desired duration for a sleep cycle and the estimated frequency of the oscillator 101 determined during the calibration. The main device may then write the new wakeup compare value to the register 125. In this case, when the main device goes back to sleep, the timing circuit 102 may reset the counter 120 to zero and power the main device back on when the count value of the counter 120 matches the new wakeup compare value in the register 125.

In the example shown in FIG. 2, the interface controller 215, the processor 212 and the second oscillator 220 of the main device 210 are coupled to the battery 204 when the battery pass circuit 105 is turned on (activated) and decoupled from the battery 204 when the battery pass circuit 105 is turned off. In contrast, the low power device 100 may be continuously powered on by the battery 204. For example, the first oscillator 101 may be continuously powered on by the battery 204 to maintain timing for the low power device 100. For ease of illustration, the power paths between the various components of the low power device 100 and the battery 204 are not explicitly shown.

Figure 4:
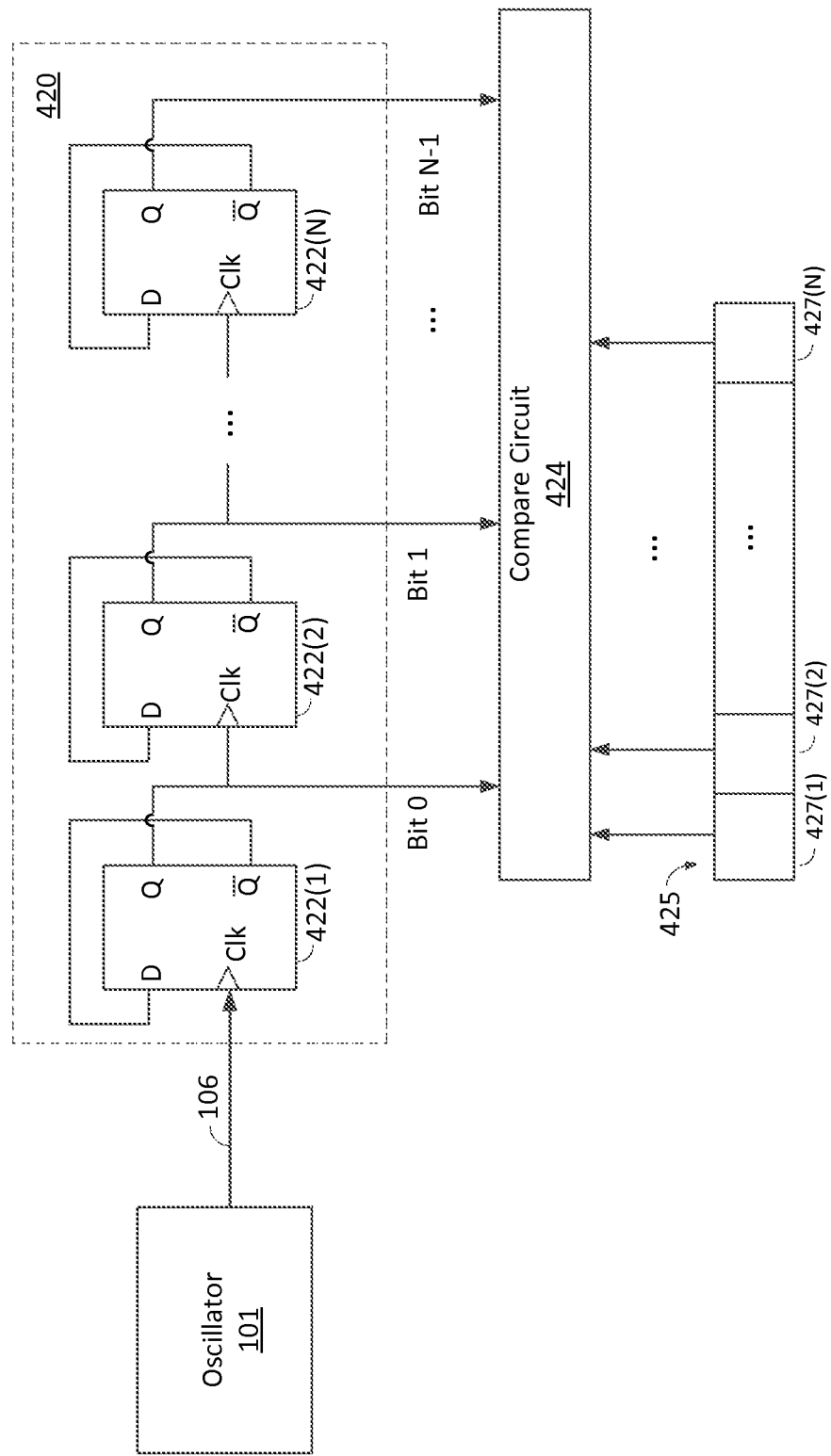
FIG. 4 shows an example of a ripple counter according to an embodiment of the present disclosure.

As discussed above, the counter 120 may be implemented using a ripple counter. In this regard, FIG. 4 shows an example of a ripple counter 420 that may be used to implement the counter 120. The ripple counter 420 comprises a plurality of flip-flops 422(1) to 422(N), in which each flip-flop has a clock input (denoted "clk"), a data input (denoted "D"), a first output (denoted "Q") and a second output (denoted "$\overline{Q}$"). Each flip-flop is configured to latch the logic state at the respective data input D on a rising edge of the respective clock clk, and to output the latched logic state at the respective first output Q and the inverse of the latched logic state at the respective second output $\overline{Q}$. As shown in FIG. 4, the data input D and second output $\overline{Q}$ of each flip-flop are tied together. This causes the first output Q of each flip-flip to toggle (change logic states) on each rising edge of the respective clock clk.

The clock input clk of the first flip-flop 422(1) is driven by the oscillator signal 106 from the first oscillator 101. The clock input clk of each of the other flip-flops 422(2) to 422(N) is driven by the first output Q of the previous flip-flop in the ripple counter 420. As a result, the output frequency of the first flip-flop 422(1) is half the frequency of the oscillator signal 106, and the output frequency of each of the other flip-flops 422(2) to 422(N) is half the output frequency of the previous flip-flop in the ripple counter 420. In other words, each flip-flop divides the input frequency (i.e., frequency at the respective clock input clk) by two at the respective first output Q.

The flip-flops 422(1) to 422(N) output N output signals, where N is the number of flip-flops and the output of each flip-flop is taken at the respective first output Q. The N output signals provide the count value for the counter 420, in which the count value comprises N bits with a maximum count value of $2^N$. The output signal of the first flip-flop 422(1) provides the least significant bit (denoted "Bit 0") of the count value and the output signal of the last flip-flop 422(N) provides the most significant bit (denoted "Bit N−1") of the count value. For the embodiment in which the counter is reset to zero, the counter 420 may be reset to zero by resetting one or more of the flip-flops 422(1) to 422(N).

FIG. 4 also shows an example of a register 425 that may be used to implement the compare register 125. The register 425 is configured to store an N-bit compare value, and comprises N bit cells 427(1) to 427(N), where each bit cell is configured to store one bit of the compare value. The bit cells may be implemented with flip-flops or other type of storage cells. In the example shown in FIG. 4, bit cell 427(1) stores the least significant bit of the compare value and bit cell 427(N) stores the most significant bit of the compare value.

In the example in FIG. 4, the timing circuit 102 also comprises a compare circuit 424 configured to compare the count value of the ripple counter 420 with the compare value in the register 425. For the example in which the compare value is used to wake up the main device 210, the compare circuit 424 may activate the battery pass circuit 105 to power on the main device 210 when the compare value matches the count value. The compare circuit 424 may be configured to compare the compare value in the register 425 with the count value of the ripple counter 420 by comparing each bit of the count value with the corresponding bit of the compare value in the register 425. For example, the compare circuit 424 may compare Bit 0 of the count value with the bit stored in bit cell 427(1) of the register 425, compare Bit 1 of the count value with the bit stored in bit cell 427(2) of the register 425, and so forth. In this example, the compare circuit 424 may determine that the count value and compare value match when each bit of the count value matches the corresponding bit of the compare value. In another example, the compare circuit 424 may compare only a subset of the bits of the count value with a subset of the bits of the compare value to determine whether there is a match. In this example, the compare circuit 424 determines a match when the subset of the bits of the count value matches the subset of the bits of the compare value.

As discussed, the oscillation signal 106 may be coupled to the processor 212 during calibration to enable the processor 212 to directly count cycles of the first oscillator 101. In another embodiment, the output signal of one of the flip-flops of the ripple counter 420 may be coupled to the processor 212 instead. For example, the output signal of the first flip-flop 422(1) may be coupled to the processor 212. In this example, the output frequency of the first flip-flop 422(1) is half the frequency of the oscillator signal 106. Therefore, when the processor 212 counts a number of cycles of the output signal of the first flip-flop 422(1), the processor 212 may double the resulting count value to determine the equivalent count value for the oscillation signal 106.

Figure 5:
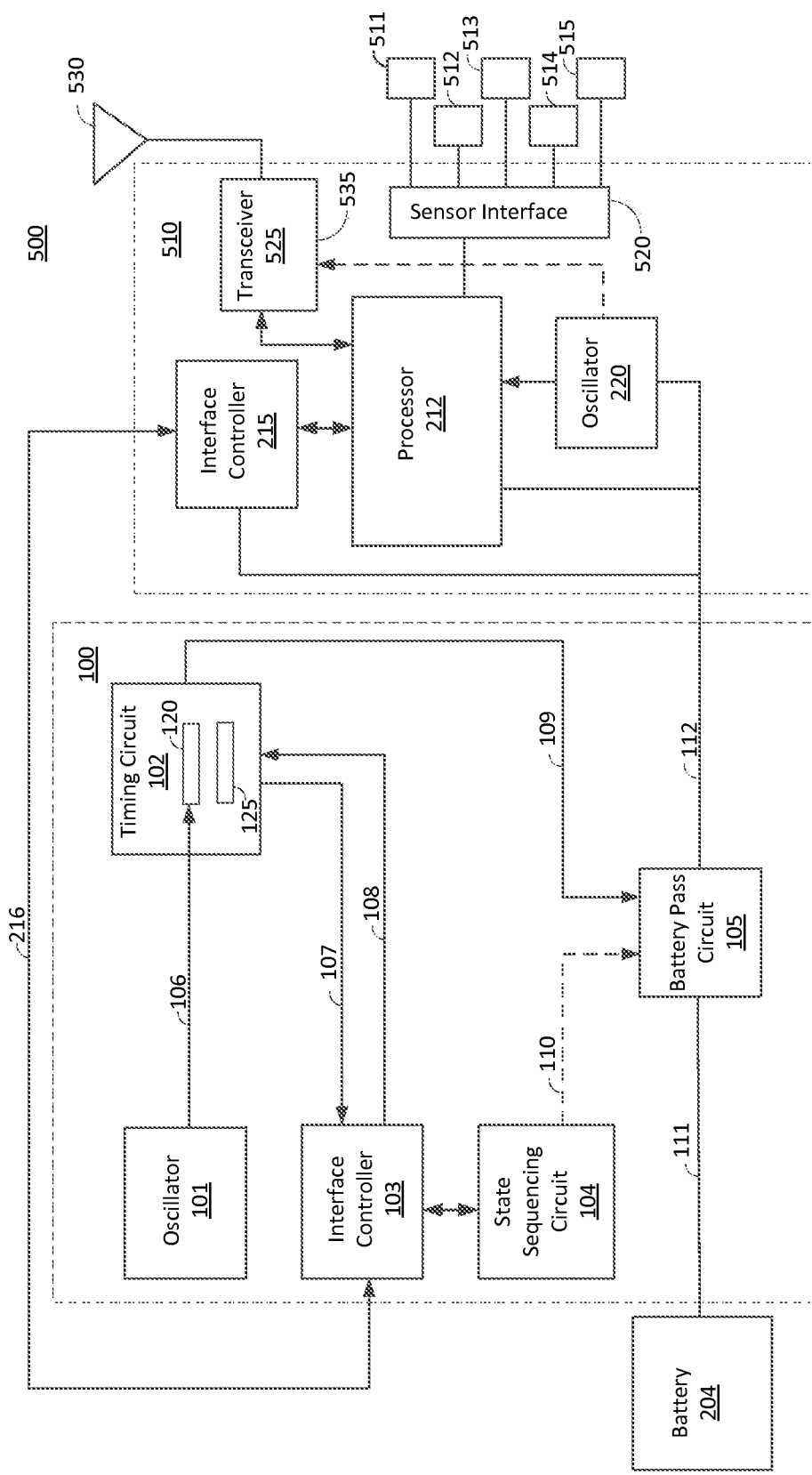
FIG. 5 shows a system including the electronic device and one or more sensors according to an embodiment of the present disclosure.

As discussed above, the low power electronic device 100 may be used to manage power in a wireless medical device or other type of wireless device to improve battery performance. In this regard, FIG. 5 shows an example of a system 500 which may be incorporated into a wireless medical device or type of device. The system 500 comprises the low power device 100, the main device 510 and the battery 204. The system 500 may further comprise an antenna 530 for wireless communication with another device (e.g., mobile device, cellular device, laptop, tablet, etc.), and one or more sensors 511 to 515 configured to measure one or more physiological conditions of a patient. In one example, the wireless device may be worn by the patient (e.g., placed on the skin of the patient).

The one or more sensors 511 to 515 may include a temperature sensor for measuring the patient's temperature, a pulse oximeter for measuring the patient's $O_2$ saturation, a pressure sensor for measuring the patient's blood pressure, an accelerometer for measuring movement of the patient, a blood sugar sensor for measuring the patient's blood sugar level, etc. It is to be appreciated that the one or more sensors 511 to 515 are not limited to the examples given above. The one or more sensors 511 and 515 may also include a contact sensor to determine whether the wireless device has been placed on a patient, as discussed further below.

In the example in FIG. 5, the main device 510 further comprises a transceiver 525 and a sensor interface 520. The transceiver 525 is configured to convert signals (e.g., baseband signals) from the processor 212 into radio-frequency (RF) signals for transmission to the other device (e.g., mobile device) via the antenna 530, and to convert RF signals received by the antenna 530 into signals (e.g., baseband signals) for processing by the processor 212. Thus, the transceiver 525 and the antenna 530 facilitate wireless communication between the other device and the processor 212. The sensor interface 520 is configured to interface the processor 212 with the one or more sensors 511 to 515. For example, the sensor interface 520 may convert a signal (e.g., analog signal) from one of the sensors into a digital sensor reading that can be processed by the processor 212. Also, the processor 212 may provide power to a sensor that requires power to operate (e.g., active sensor) via the sensor interface 520.

As shown in FIG. 5, the second oscillator 220 may be coupled to the transceiver 525 to provide an oscillator signal to the transceiver 525. The transceiver 525 may use the oscillator signal for frequency up-conversion, frequency down-conversion, etc. Thus, in this example, the second oscillator 220 may be used for both calibration of the first oscillator 101 (as discussed above) and radio communication.

As discussed above, the main device 510 may spend most of the time in the sleep state, in which the low power device 100 periodically wakes up the main device 510 to perform one or more task during each wakeup cycle. More particularly, the low power device 100 may wake up the main device 510 when an expiry event occurs (e.g., the count value of the counter 120 matches the wakeup compare value in the compare register 125) by activating the battery pass circuit 105. After waking up, the processor 212 may program the wakeup compare value for the next wakeup cycle into the low power device 100, as discussed above. The processor 212 may also perform one or more tasks, and upon completion of the one or more tasks, send a sleep signal to the low power device 100 to turn off the main device 510 until the next wakeup cycle. The one or more tasks may include receiving sensor data from one or more of the sensors 511 to 515 via the sensor interface 520 and transmitting the sensor data to the other device (e.g., mobile device) via the transceiver 525 and antenna 530.

Thus, in this example, the low power device 100 may periodically wake up the main device 510 to take one or more sensor readings and transmit corresponding sensor data to the other device (e.g., mobile device). The duty cycle of activity of the main device 510 may be made very small to extend the battery life of the wireless device (e.g. wireless medical device).

It is to be appreciated that the main device 510 is not limited to transmitting sensor data to the other device (e.g., mobile device) during each wakeup cycle. For example, the processor 212 may transmit sensor data to the other device during every Mth wakeup cycle, where M is an integer greater than one. In this example, the processor 212 may collect sensor data from one or more of the sensors 511 to 515 during each wakeup cycle and store the sensor data in a memory on the low power device 100 or the main device 510. The sensor data for each wakeup cycle may be time stamped to identify when the corresponding sensor readings were taken. During each Mth wakeup cycle, the processor 212 may retrieve the sensor data collected since the last transmission to the other device, and transmit the sensor data to the other device via the transceiver 525 and the antenna 530. This may further reduce power consumption by reducing the frequency at which the transceiver 525 is powered on.

In this example, the processor 212 may keep track of the number of times the main device 210 has been woken up using a wakeup register. Each time the main device 210 wakes up, the processor 212 may increment the wakeup register by one. Each time the count in the wakeup register reaches M, the processor 212 may transmit sensor data to the other device and reset the wakeup register to zero. Alternatively, the processor 212 may transmit sensor data to the other device each time the count in the wakeup register is a multiple of M. In either case, the processor 212 may read the wakeup register each time the main device 510 wakes up to determine whether to transmit sensor data to the other device.

In some aspects, the processor 212 may process sensor data to determine whether to transmit the sensor data to the other device. For example, the processor 212 may process the sensor data to determine whether the sensor data is within a normal range. If the sensor data is within the normal range, then the processor 212 may determine not to transmit the sensor data or to transmit the sensor data during a later wakeup cycle (e.g., Mth wakeup cycle). If the sensor data is outside the normal range, then the processor 212 may decide to transmit the sensor data to the other device during the current wakeup cycle (e.g., to alert the patient, medical personal, etc.). This may assume that the other device (e.g., mobile device) has a user interface (e.g., display) for communicating with the patient.

As discussed above, the state sequencing circuit 104 may keep track of a state of the wireless device (e.g., wireless medical patch). In one embodiment, the wireless device may sequentially transition through a plurality of states (modes) during the lifetime of the wireless device. In this embodiment, the one or more tasks performed by the main device 510 during a wakeup cycle may depend on which state (mode) the wireless device is in. Thus, when the main device 510 wakes up, the main device 510 may need to determine which state (mode) the wireless device is in in order to determine which task(s) to perform during the current wakeup cycle. In this regard, the state sequencing circuit 104 may include a state register configured to store the current state (mode) of the wireless device. In one example, each state may correspond to a different numeral value, and the state register may store the numerical value of the current state. In this example, when the main device 510 wakes up, the main device 510 may read the numerical value stored in the state register and identify the current state (mode) of the wireless device based on the read numerical value. Exemplary states of the wireless device (e.g., wireless medical device) are discussed below according to various embodiments of the present disclosure.

In one example, when the low power device 100 is initially powered on, the state sequentially circuit 104 may be initially set to a first state (mode). In this state, the low power device 100 may automatically turn on the battery pass circuit 105 by default without comparing the count value of the counter 120 to a wakeup compare value. This may be done, for example, by initially disabling the sleep timer function. Upon waking up, the processor 212 may read the state in the state register and determine that the wireless device is in the first state. The processor 212 may then place the wireless device in a second state (mode) by setting the state in the state register to the second state (mode).

In one embodiment, the second state may involve the main device 510 going back to sleep for an extended period of time (e.g., one or more days). For example, the low power device 100 may be initially powered on in a manufacturing plant, in which the wireless device is being assembled. In this example, after the low power device 100 is initially powered on, the wireless device may not be expected to be worn by a patient for at least a certain period of time. The period of time may include expected shipping time from the manufacturing plant to a facility (e.g., hospital, pharmacy, etc.) at which the wireless device is to be given to the patient. In this example, when the processor 212 wakes up in the first state, the processor 212 may place the low power device 100 in the second state, program a wakeup compare value in the compare register, and send a control signal to the low power device 100 to turn off the battery pass circuit 105 to put the main device 510 back to sleep. The processor 212 may also enable the sleep timer function, which may be initially disabled, as discussed above. The wakeup compare value may be a count value corresponding to the period of time that the main device 510 is to remain off in the second state. The second state may be referred to as a factory state or mode.

In the second state, the timing circuit 102 may turn on the main device 510 when the count value of the counter 120 reaches the wakeup compare value in the compare register 125. After waking up, the processor 212 may read the state in the state register and determine that the wireless device is in the second state (e.g., factory state). After determining that the wireless device is in the second state, the processor 212 may transition the wireless device to a third state (mode).

In another embodiment, the time duration of the second state (e.g., factory state) may exceed the maximum count of the counter 120. Thus, in this embodiment, the main device 510 may need to be woken up multiple times in the second state. For example, the low power device 100 may include a wakeup register that keeps track of the number of times that the main device 510 has been woken up in the second state. In this example, the time duration of the second state may be approximately equal to:

$$T = S \cdot \Delta t \quad (5)$$

where T is the time duration of the second state, S is the number of wakeup cycles in the second state, and $\Delta t$ is the sleep time between adjacent wakeup cycles (duration of a sleep cycle), in which the sleep time does not exceed the maximum count of the counter 120. In this example, each time the processor 212 wakes up in the second state, the processor 212 reads the state in the stage register and determines that the wireless device is in the second state. The processor 212 may then check the wakeup register to determine whether the main device 510 has been woken up S times in the second state. If not, then the processor 212 may increment the wakeup register, program a new wakeup compare value into the compare register corresponding to the next wakeup cycle, and send a sleep signal to the low power device 100 to turn off the battery pass circuit 105 to put the main device 510 back to sleep. If the main device 510 has been woken up S times in the second state (e.g., factory state), then the processor 212 may transition the wireless device to the third state (mode) by setting the state in the state register to the third state. In this example, the counter 120 may roll over each time the counter 120 reaches the maximum count of the counter 120.

In another embodiment, the timing circuit 102 may reset the counter 120 to zero each time the main device is awoken in the second state (mode). In this embodiment, the wakeup compare value in the register 125 may stay the same in the second state. Each time the processor 212 wakes up in the second state, the processor 212 reads the state in the state register and determines that the wireless device is in the second state. The processor 212 may then check the wakeup register to determine whether the main device 510 has been woken up S times in the second state. If not, then the processor 212 may increment the wakeup register and send a sleep signal to the low power device 100 to turn off the battery pass circuit 105 to put the main device 510 back to sleep. In this embodiment, the processor 212 does not read and update the compare value since the compare value stays the same, thereby reducing power consumption. If the main device 510 has been woken up S times in the second state (e.g., factory state), then the processor 212 may transition the wireless device to the third state (mode) by setting the state in the state register to the third state.

In yet another embodiment, the timing circuit 102 may automatically increment the wakeup register when the count value of the counter 120 reaches the compare value and reset to the counter to zero without waking up the main device. The timing circuit 102 may wake up the main device when the count in the wakeup register reaches S, indicating that the low power device has been in the second state (mode) for the desired duration. This allows the timing circuit 102 to keep track of a long period of time without having to wake up the main device, thereby reducing power consumption.

In the third state, the low power device 100 may periodically wake up the main device 510 to determine whether the wireless device has been placed on a patient. For example, each time the main device 510 wakes up in the third state, the processor 212 may receive a sensor reading from a contact sensor to determine whether the wireless device has been placed on a patient. In one embodiment, the contact sensor may comprise a planar capacitor that is orientated approximately horizontally with respect to a patient's skin when the wireless device (e.g., wireless medical device) is placed on the patient's skin. In this embodiment, the capacitance of the capacitor may change significantly depending on whether the wireless device is placed on the patient's skin.

If the processor 212 determines that the wireless device is not on a patient, then the processor 212 may program a new wakeup compare value into the compare register 125 corresponding to the next wakeup cycle, and send a sleep signal to the low power device 100 to put the main device 510 back to sleep. In this case, the timing circuit 102 wakes up the main device 510 when the count value of the counter 120 reaches the new wakeup compare value. If the processor 212 determines that the wireless device is on a patient, then the then the processor 212 may transition the wireless device to a fourth state (mode) by setting the state in the state register to the fourth state.

For the embodiment in which the timing circuit 102 resets the counter 120 to zero each time the main device goes back to sleep, the compare value may stay the same in the third state (mode). In this example, the processor 212 may write the compare value to the register 125 when the wireless device first enters the third state (mode), in which the compare value corresponds to a desired duration between wakeups in the third state (mode). After the compare value is initially written to the register 125, the compare value may stay the same for the duration of the third state. In this example, each time the counter 120 reaches the compare value, the timing circuit 102 may wake up the main device and the processor 212 may determine whether the wireless device has been placed on a patient. If the wireless device has not been placed on a patient, then the main device may send a sleep signal to the low power device. The timing circuit 102 may then power off the main device and reset the counter 120 to zero.

Thus, the wireless device may remain in the third state until the wireless device is placed on a patient. The third state may be referred to as a shelf state (mode), in which the wireless device is waiting to be placed on a patient. The wireless device may remain in the third state (shelf state) for a long period of time (e.g., weeks, months, etc.). There may be a tradeoff between the shelf life of the wireless device and how quickly the wireless device detects that it has been placed on a patient. For instance, increasing the time duration between wakeup cycles may increase the shelf life while also potentially increasing the time it takes for the wireless device to detect that it has been placed on a patient. This is because, when the wireless device is placed on a patient while the main device 510 is asleep, the wireless device does not detect the patient until the next wakeup cycle.

When the wireless device enters the fourth state, the processor 212 may turn on the transceiver 525 and perform a discovery procedure for discovering nearby devices (e.g., mobile device) via the antenna 530. For example, when the wireless device communicates with other devices using a Bluetooth protocol, the processor 212 may preform discovery according to the Bluetooth protocol. Upon discovering a nearby device, the processor 212 may exchange persistent keys and/or other information with the nearby device, and store the keys and/or other information in a memory in the low power device 100 or the main device 510. When the processor 212 is reawakened, the processor 212 may reestablish a wireless link with the nearby device using the stored keys and/or other information without having to perform the discovery procedure again. The fourth state may be referred to as a discovery state (mode).

After device discovery, the processor the processor 212 may transition the wireless device to a fifth state (mode) by setting the state in the state register to the fifth state. In the fifth state, the low power device 100 may periodically wake up the main device 510 to collect sensor data from one or more of the sensors 511 to 515, as discussed above. More particularly, each time the main device 510 wakes up, the processor 212 may receive sensor readings from one or more of the sensor 511 to 515 and transmit corresponding sensor data to the nearby device via the transceiver 525 and 530. The processor 212 may also program a new wakeup compare value into the compare register 125 for the next wakeup cycle, and send a sleep signal to the low power device 100 to turn off the main device 510. As discussed above, the processor 212 may transmit sensor data to the nearby device every Mth wakeup cycle instead of every wakeup cycle and/or transit sensor data to the nearby device when the sensor data is outside a normal range. The fifth state may be referred to as a mission state (mode).

In the fifth state (mode), the wakeup times of the main device 510 may be synchronized with the nearby device. In this example, the nearby device may turn on a transceiver to receive sensor data from the wireless device during every wakeup cycle or every Mth wakeup cycle of the main device 510. To maintain time synchronization with the nearby device, the processor 212 may periodically calibrate the first oscillator 101 (e.g., to compensate for frequency drift of the first oscillator 101).

In one embodiment, the wireless device may remain in the fifth state (mode) for a predetermined period of time. For example, the wireless device may remain in the fifth state over W wakeup cycles, where W is an integer greater than one. In this example, the low power device 100 may include a wakeup register that tracks the number of time that the main device 510 has been woken up in the fifth state (mission state). Each time the processor 212 wakes up, the processor 212 reads the state in the stage register and determines that the wireless device is in the fifth state. The processor 212 may then check the wakeup register to determine whether the main device 510 has been woken up W times in the fifth state. If not, then the processor 212 may increment the wakeup register and perform one or more of the tasks discussed above.

If the main device 510 has been woken up W times in the fifth state, then the processor 212 may quickly drain the battery 204 to terminate operation of the wireless device. The processor 212 may do this, for example, by continuously powering on a high-power component (e.g., the transceiver 525) of the wireless device. Before the battery is drained to terminate operation, the processor 212 may transmit a message to the nearby device indicating that the wireless device has reached the end of its useful life and/or perform one or more other tasks.

In one embodiment, the low power device 100 may include a wakeup register that keeps track of the time duration that the low power device 100 is the third state (e.g., shelf mode). In this embodiment, each time the main device 510 is awoken to determine whether the wireless device has been placed on a patient, the count in the wakeup register may be incremented by the timing circuit 102 or the main device 510. When the main device transitions to the fourth state, the processor 212 may read the count in the wakeup register to determine how long the wireless device has been in the third state (e.g., by multiplying the count by the duration of a sleep cycle in the third state). The main device may then transmit this information to the nearby device (e.g., via a wireless link). The nearby device may display this information to the patient to inform the patient how long the wireless device has been in the third sate (e.g., on the shelf). For example, if the wireless device has been on the shelf too long, the then the patient may try another wireless device.

In one aspect, the processor 212 may determine power drain on the battery 204 from the third state (e.g., shelf state) based on the count in the wakeup register. For example, the processor 212 may estimate the power drain by multiplying the count by the power drain for each wakeup cycle in the third state. Based on the estimated power drain from the third state, the processor 212 may estimate the remaining power in the battery 204. The processor 212 may then estimate a time duration that the wireless device may operate in the fifth state (mission state) with the remaining battery power. The processor 212 may do this by dividing the remaining battery power by an estimated power drain for each wakeup cycle in the fifth state to estimate a number of wakeup cycles in the fifth state, and multiplying the number of wakeup cycles by the duration between adjacent wakeup cycles. After determining the duration that the wireless device may operate in the fifth state with the remaining battery power, the main device 515 may transmit the duration to the nearby device for display to the patient. This may allow the patient to determine how long the wireless device will last. The patient may use this information, for example, to determine whether to order another wireless device before the current device stops functioning.

As discussed above, the processor 212 may estimate a number of wakeup cycles in the fifth state with the remaining battery power. In this example, the processor 212 may set the number of times W that the main device is to be awoken in the fifth state based on the estimated number, and store the number W in the state sequencing circuit 104. As discussed above, the number of times that the main device is awoken in the fifth state may be tracked by incrementing a wakeup register each time the main device is awoken in the fifth state. When the main device has been woken up W times in the fifth state, the processor 212 may quickly drain the battery 204 to terminate operation of the wireless device.

The low power device 100 may comprise a plurality of wakeup registers (e.g., one for tracking the number of wakeups in the second state, one for tracking the number of wakeups in the third state, and one for tracking the number of wakeups in the fifth state). In another aspect, the low power device 100 may use the same wakeup register for different states. For example, the low power device 100 may use the same wakeup register for the third and fifth states, in which the wakeup register may be reset to zero when the low power device enters the fifth state. In this example, the wakeup register may be read by the processor 212 before the wakeup register is reset so the processor 212 can determine how long the wireless device has been in the third state.

In one aspect, the low power device 100 may comprise volatile memory, which may include one or more of the registers discussed above. In this aspect, the volatile memory may remain continuously powered on from the time the low power device is initially powered on (e.g. in a manufacturing facility) to the time that operation of the wireless device is terminated. As a result, the information stored in the memory may be lost when operation of the wireless device is terminated. This may be desirable, for example, when the information includes sensitive patient information (e.g., sensor data for the patient). The loss of the sensitive information prevents an unauthorized person from later retrieving the information from the wireless device.

It is to be appreciated that the states discussed above are exemplary only, and that the present disclosure is not limited to these states or any particular order of these states. One or more of the exemplary states discussed above may be omitted. Further, the wireless device may have one or more intermediate states between the exemplary states discussed above.

It is to be appreciated that, although the low power device 100 is useful for extending the battery life of a medical device (e.g., medical patch), the low power device 100 is not limited to this example. In general, the low power device 100 may be used to improve battery life for any mobile application in which a main device has a low duty of activity (spends most of the time in a sleep state).

The low device 100 and the main device 510 may be fabricated on the same die. In another example, the low power device 100 and the main device 510 may be fabricated on separate dies and packaged in a same circuit package (e.g., multi-chip package). In yet another example, the low power device 100 and the main device 510 may be fabricated on separate dies and packaged in separate circuit packages.

In one example, the timing circuit 102, the interface controller 103 and the state sequencing circuit 104 may be implemented on the same die with the oscillator 101 (e.g., crystal oscillator) implemented on a separate die. In still another example, the timing circuit 102, the interface controller 103, the state sequencing circuit 104 and the oscillator (e.g., low power RC oscillator) may be implemented on the same die with the battery pass circuit 105 implemented on a separate die.

It is to be appreciated that the counter 120 may roll over one or more times during the lifetime of the wireless time depending on the maximum count of the counter 120, the frequency of the first oscillator 101, and the duration of the lifetime. In this case, the processor 212 may have knowledge of the maximum count of the counter 120, and therefore know when the counter rolls over. The processor 212 may use this knowledge to adjust the wakeup compare value accordingly. For example, the processor 212 may roll over a wakeup compare value when the wakeup compare value reaches the maximum count of the counter 120.

Figure 6:
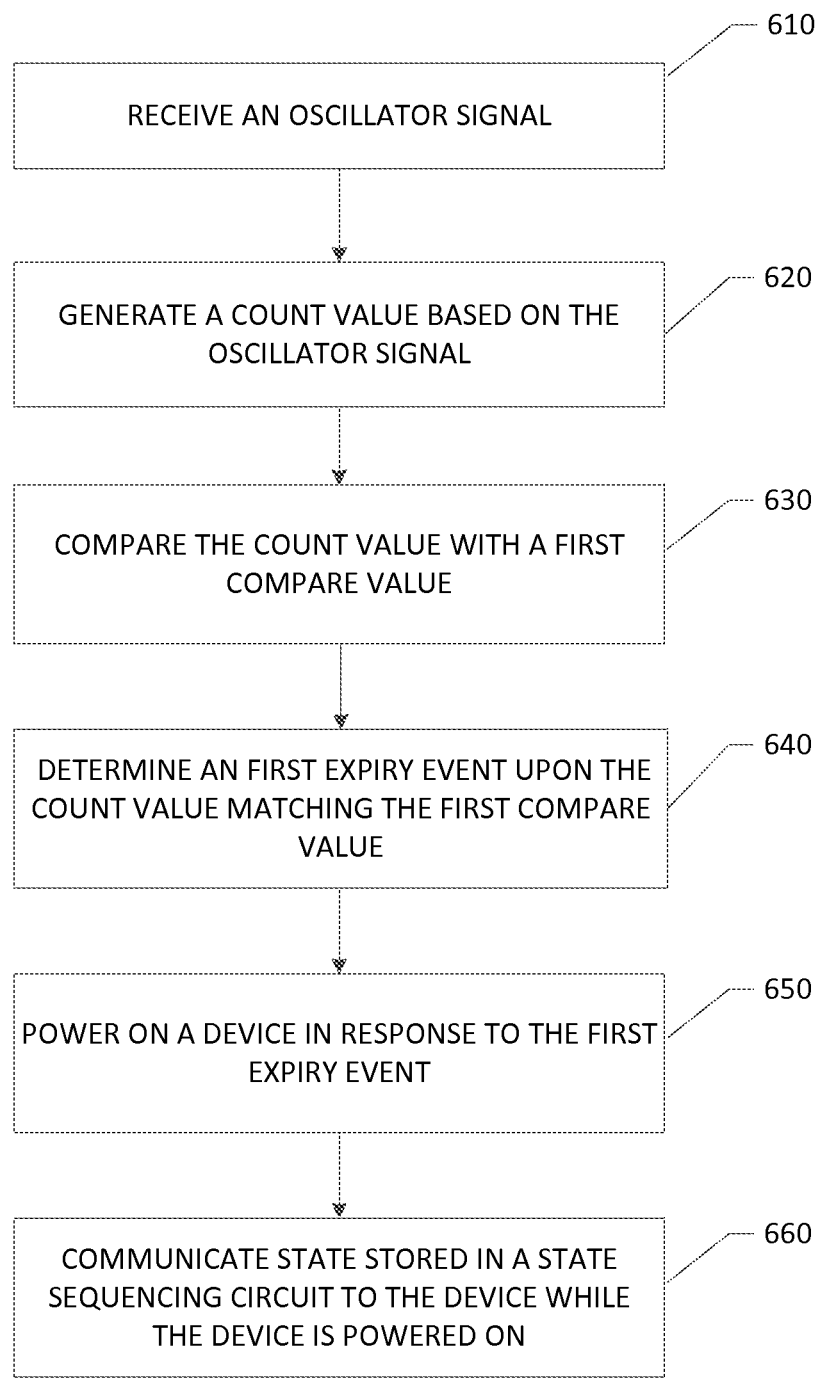
FIG. 6 is a flowchart illustrating a method for extending battery life in mobile applications according to an embodiment of the present disclosure.

FIG. 6 is a flow diagram of a method 600 operable on an electronic device for extending battery life in mobile applications according to an embodiment of the present disclosure.

In step 610, the oscillator signal is received from an oscillator. The oscillator may be a low power oscillator (e.g., oscillator 101) such as a crystal oscillator, an LC oscillator, am RC oscillator, etc.

In step 620, a count value is generated based on the oscillator signal. For example, the count value may be generated by driving a counter (e.g., counter 120) with the oscillator signal.

In step 630, the counter value is compared with a first compare value. For example, the first compare value (e.g., wakeup compare value) may correspond to a wakeup time of a device (e.g., main device 210 or 510).

In step 640, a first expiry event is determined upon the count value matching the first compare value. In step 650, a device is powered on in response to the first expiry event. For example, the device (e.g., main device 210 or 510) may be powered on by turning on a power switch (e.g., battery pass circuit 105) between a battery (e.g., battery 204) and the device.

In step 660, a state stored in a state sequencing circuit is communicated to the device while the device is powered on. For example, the device (e.g., main device 210 or 510) may read the state from the state sequencing circuit (e.g., state sequencing circuit 104) via an interface (e.g., interface 103). The device may determine which task(s) to perform based on the read state.

Those skilled in the art would appreciate that the circuits described herein may be realized using a variety of transistor types, and are therefore not limited to the particular transistor types shown in the figures. For example, transistor types such as bipolar junction transistors, junction field effect transistor or any other transistor type may be used. Those skilled in the art would also appreciate that the circuits described herein may be fabricated with various IC process technologies such as CMOS, bipolar junction transistor (BJT), bipolar-CMOS (BiCMOS), silicon germanium (SiGe), gallium arsenide (GaAs), etc.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A system comprising:
   an oscillator configured to generate an oscillator signal;
   a timing circuit configured to generate a count value based on the oscillator signal, to compare the count value with a first compare value, to determine a first expiry event upon the count value matching the first compare value, and to generate a first wakeup signal in response to the first expiry event;
   a battery pass circuit configured to receive the first wakeup signal, and to couple a power source to a main device in response to the first wakeup signal to wake up the main device;
   a state sequencing circuit configured to store a state of the main device;
   an interface circuit configured to communicate the stored state to the main device;
   a register configured to track a number of times that the main device has been woken up in the stored state; and
   a processor configured to read the number of times that the main device has been woken up in the stored state from the register, and to determine a duration that the main device has been in the stored state based on the number of times that the main device has been woken up in the stored state and a duration between adjacent wake ups of the main device.

2. The system of claim 1, wherein the interface circuit is configured to receive a second compare value for a next wakeup cycle from the main device, and to program the second compare value into the timing circuit.

3. The system of claim 2, wherein the interface circuit is configured to receive a sleep signal from the main device and to instruct the timing circuit to turn off the battery pass circuit in response to the sleep signal to power off the main device.

4. The system of claim 3, wherein, after the main device is powered off, the timing circuit is configured to compare the count value with the second compare value, to determine a second expiry event upon the count value matching the second compare value, and to generate a second wakeup signal in response to the second expiry event, wherein the battery pass circuit wakes up the main device in response to the second wakeup signal.

5. The system of claim 1, wherein the timing circuit comprises a counter driven by the oscillator signal, and the counter is configured to generate the count value.

6. The system of claim 1, further comprising a switch between the oscillator and the main device, wherein the switch is configured to couple the oscillator to the main device in response to a control signal from the main device.

7. The system of claim 6, wherein the switch is configured to receive the control signal via the interface circuit.

8. The system of claim 1, wherein the interface circuit is configured to sequentially receive a plurality of state update signals from the main device, each of the plurality of state update signals corresponding to a different state of the main device, and to update the state stored in the state sequencing circuit in response to each of the plurality of state update signals.

9. The system of claim 1, wherein the interface circuit is further configured to sequentially receive a plurality of state update signals from the main device, and to update the state stored in the state sequencing circuit in response to each of the plurality of state update signals, wherein each of the plurality of state update signals corresponds to a different one of a plurality of states of the main device, in a first one of the plurality of states of the main device, the main device is configured to periodically check a contact sensor to detect the presence of a patient, and, in a second one of the plurality of states of the main device, the main device is configured to periodically collect sensor data from one or more sensors.

10. The system of claim 9, wherein, in the second one of the plurality of states of the main device, the main device is configured to periodically transmit the sensor data wirelessly to an external device.

11. A method for extending battery life in a mobile application, the method comprising:
    receiving an oscillator signal from an oscillator;
    generating a count value based on the oscillator signal;
    comparing the count value with a first compare value;
    determining a first expiry event upon the count value matching the first compare value;
    waking up a main device in response to the first expiry event;
    communicating a state stored in a state sequencing circuit to the main device while the main device is powered on;
    tracking a number of times that the main device has been woken up in the stored state; and
    determining a duration that the main device has been in the stored state based on the number of times that the main device has been woken up in the stored state and a duration between adjacent wake ups of the main device.

12. The method of claim 11, further comprising receiving a second compare value for a next wakeup cycle from the main device.

13. The method of claim 12, further comprising:
receiving a sleep signal from the main device; and
powering off the main device in the response to the sleep signal.

14. The method of claim 13, further comprising:
after the main device is powered off, comparing the count value with the second compare value;
determining a second expiry event upon the count value matching the second compare value; and
waking up the main device in response to the second expiry event.

15. The method of claim 11, further comprising incrementing the count value at a rate based on a frequency of the oscillator.

16. The method of claim 11, further comprising:
receiving a control signal from the main device; and
coupling the oscillator signal to the main device in response to the control signal.

17. The method of claim 11, further comprising:
sequentially receiving a plurality of state update signals from the main device, each of the plurality of state update signals corresponding to a different state of the main device; and
updating the state stored in the state sequencing circuit in response to each of the plurality of state update signals.

18. The method of claim 11, further comprising:
sequentially receiving a plurality of state update signals from the main device; and
updating the state stored in the state sequencing circuit in response to each of the plurality of state update signals;
wherein each of the plurality of state update signals corresponds to a different one of a plurality of states of the main device, in a first one of the plurality of states of the main device, the device periodically checks a contact sensor to detect the presence of a patient, and, in a second one of the plurality of states of the main device, the device periodically collects sensor data from one or more sensors.

19. The method of claim 18, wherein, in the second one of the plurality of states of the main device, the main device periodically transmits the sensor data wirelessly to an external device.

20. An apparatus for extending battery life in a mobile application, the apparatus comprising:
means for receiving an oscillator signal from an oscillator;
means for generating a count value based on the oscillator signal;
means for comparing the count value with a first compare value;
means for determining a first expiry event upon the count value matching the first compare value;
means for waking up a main device in response to the first expiry event;
means for communicating a state stored in a state sequencing circuit to the main device while the main device is powered on;
means for tracking a number of times that the main device has been woken up in the stored state; and
means for determining a duration that the main device has been in the stored state based on the number of times that the main device has been woken up in the stored state and a duration between adjacent wake ups of the main device.

21. The apparatus of claim 20, further comprising means for receiving a second compare value for a next wakeup cycle from the main device.

22. The apparatus of claim 21, further comprising:
means for receiving a sleep signal from the main device; and
means for powering off the main device in the response to the sleep signal.

23. The apparatus of claim 22, further comprising
means for comparing the count value with the second compare value after the main device is powered off;
means for determining a second expiry event upon the count value matching the second compare value; and
means for waking up the main device in response to the second expiry event.

24. The apparatus of claim 20, further comprising means for incrementing the count value at a rate based on a frequency of the oscillator.

25. The apparatus of claim 20, further comprising:
means for receiving a control signal from the main device; and
means for coupling the oscillator signal to the main device in response to the control signal.

26. The apparatus of claim 20, further comprising:
means for sequentially receiving a plurality of state update signals from the main device, each of the plurality of state update signals corresponding to a different state of the main device; and
means for updating the state stored in the state sequencing circuit in response to each of the plurality of state update signals.

27. The apparatus of claim 20, further comprising:
means for sequentially receiving a plurality of state update signals from the main device; and
means for updating the state stored in the state sequencing circuit in response to each of the plurality of state update signals;
wherein each of the plurality of state update signals corresponds to a different one of a plurality of states of the main device, in a first one of the plurality of states of the main device, the device periodically checks a contact sensor to detect the presence of a patient, and, in a second one of the plurality of states of the main device, the device periodically collects sensor data from one or more sensors.

28. The apparatus of claim 27, wherein, in the second one of the plurality of states of the main device, the main device periodically transmits the sensor data wirelessly to an external device.

29. The system of claim 1, wherein the state sequencing circuit is configured to change the stored state of the main device when the number of times that the main device has been woken up in the stored state reaches a predetermined number.

30. The system of claim 9, wherein the one or more sensors comprises at least one of a pulse oximeter, a blood pressure sensor, or a blood sugar sensor.

31. The system of claim 9, wherein the one or more sensors comprises a temperature sensor configured to measure a temperature of the patient.

32. The system of claim 1, wherein the processor is in the main device.

33. The system of claim 1, wherein the system further comprises a transceiver, and the processor is configured to transmit the duration that the main device has been in the stored state to an external device via the transceiver.

34. The system of claim 9, wherein the system further comprises
a transceiver,
and the processor is further configured to transmit at least portion of the sensor data collected by the main device to an external device via the transceiver when the number of times that the main device has been woken up in the second one of the plurality of states of the main device reaches a predetermined number.

35. The system of claim 9, wherein the system further comprises a transceiver, and wherein, in a third one of the plurality of states of the main device, the processor is configured to perform a discovery procedure using the transceiver to discover an external device, and, in the second one of the plurality of states of the main device, the processor is further configured to transmit at least portion of the sensor data collected by the main device to the external device via the transceiver.

* * * * *